CERTAIN PHENOBARBITAL SALTS

This invention relates to selected salts and to therapeutic compositions containing same.

More specifically, this invention relates to compounds having the structural formula

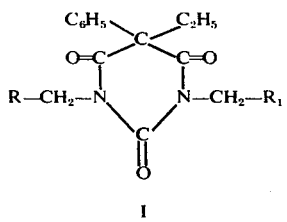

I wherein R is $Y^+X^-$, Y being a 2-thiouronium or N-phenyl-2-thiouronium group or hexamethylenetetramine and X being bromine or chlorine, and $R_1$ is hydrogen or R.

Recently a series of N,N'-bis-halomethyl phenobarbital compounds having utility as anticonvulsant agents have been discovered. These compounds are fully described in U.S. Pat. No. 3,635,980, which is hereby incorporated by reference in its entirety.

Now it has been found that selected salts can be prepared from the aforementioned bis-halomethyl compounds and corresponding methyl-halomethyl compounds, and that said salts have central nervous system depressant activity.

More in detail, salts having the formula I can be prepared by reacting N,N'-bis-bromomethyl phenobarbital, N,N'-bis-chloromethyl phenobarbital, 1-methyl-3-bromomethyl phenobarbital or 1-methyl-3-chloromethyl phenobarbital with thiourea, phenylthiourea or hexamethylenetetramine in the presence of an inert solvent. Suitable solvents include acetone, acetonitrile, dimethylformamide, dimethylacetamide, etc. The reaction can be carried out at any temperature from about room temperature up to the boiling point of the particular solvent employed in the reaction. The desired salts I are readily obtained in good yield and are isolated and purified by conventional techniques such as crystallization, extraction, distillation, filtration, preparative chromatography, etc.

The 1-methyl-3-halomethyl phenobarbitals used as reactants in preparing the compounds of this invention can be prepared by reacting 1-methyl-3-methoxymethyl phenobarbital, which is described in copending application, Ser. No. 259,252, filed June 2, 1972, with acetyl bromide or acetyl chloride in the presence of a Lewis Acid catalyst such as stannic bromide, stannic chloride, zonc chloride, aluminum chloride or boron trifluoride etherate. The reaction is carried out over a temperature range of from 10°C to 150°C, the methyl-halomethyl compound being isolated and purified by the aforementioned conventional techniques.

While any compound having the formula I can be readily prepared, preferred embodiments of this invention are directed to compounds I where X is bromine.

The compounds of this invention can be formulated for oral or parenteral administration according to conventional techniques. Effectiveness and toxicity of these compounds is such that each dosage unit can contain from 5 to 500 mg. of active material. Compositions for oral administration can be solid or liquid and can take the form of syrups, isotonic solutions, tablets, capsules etc. Suitable solid physiologically acceptable carriers include lactose, magnesium stearate, sucrose, talc, stearic acid, gelatin, polyvinyl pyrrolidone etc. Exemplary liquid physiologically acceptable carriers are peanut oil, olive oil, sesame oil and water. Furthermore, the carrier may include a time delay material such as glyceryl monostearate or glyceryl distearate, alone or in combination with a wax.

If a solid carrier is used, the preparation can be tabletted, placed in a hard gelatin capsule or in the form of a troche or lozenge. The amount of solid carrier will vary widely but preferably will be from about 25 mg. to about 1 g. If a liquid carrier is used, the preparation may be in the form of a soft gelatin capsule, placed in an ampule or in a liquid suspension.

For parenteral administration, the carrier or excipient may be a sterile, parenterally acceptable liquid; e.g., water or a parenterally acceptable oil; e.g., arachis oil contained in ampules.

While any of the above compositions are efficacious, preferred are tablets for oral administration.

As previously mentioned, these salts exhibit central nervous system depressant activity. Thus, for example, the salts prepared from thiourea exhibit analgetic, reserpine-like and anticonvulsant activity, the salts derived from phenylthiourea have analgetic activity and the salts derived from hexamethylenetetramine are useful as skeletal muscle relaxants.

In the following examples which will serve to illustrate the practice of this invention, all tests were conducted on adult albino male mice (Charles River strain); the dosage consisted of the active agent suspended in 10% aqueous acacia and was administered orally unless otherwise indicated.

Acute oral toxicity and acute intraperitoneal toxicity were determined in the conventional manner. The results were expressed as $LD_{50}$, the dose required to produce death in 50% of the animals treated, determined graphically.

Central nervous system depressant activity was determined using the method of Reinhard and Scudi, Proceedings of the Society for Experimental Biology and Medicine, Vol. 100, pp. 381–383 (1959), along with the prolongation of the effect of a hypnotic dose of hexobarbital according to the method of Reinhard, Proceedings of the Society for Experimental Biology and Medicine, Vol. 58, p. 210 (1945). Central nervous system depressant activity was also measured by the ability of the test compound to protect against the lethal effect of a toxic dose of strychnine sulfate. Observation (visual and touch) in the animals tested, of muscle flaccidity, without interference with spontaneous respiration after administration of the test compound, was also taken as an indication of central nervous system depressant activity.

Sedative or reserpine-like activity was discerned according to the method of Lim, Pharmacologic Techniques in Drug Evaluation, pp. 291–297 (1964) by visual observation of eyelid closure.

The tail flick test was utilized in determining analgetic activity. This test is based on the reaction of the animal to flick its tail when its tail is placed on a hot plate; the reaction time of the animal to the stimulus is noted before and after the test compound is given.

Anticonvulsant effectiveness against maximal electroshock was determined after administration of the

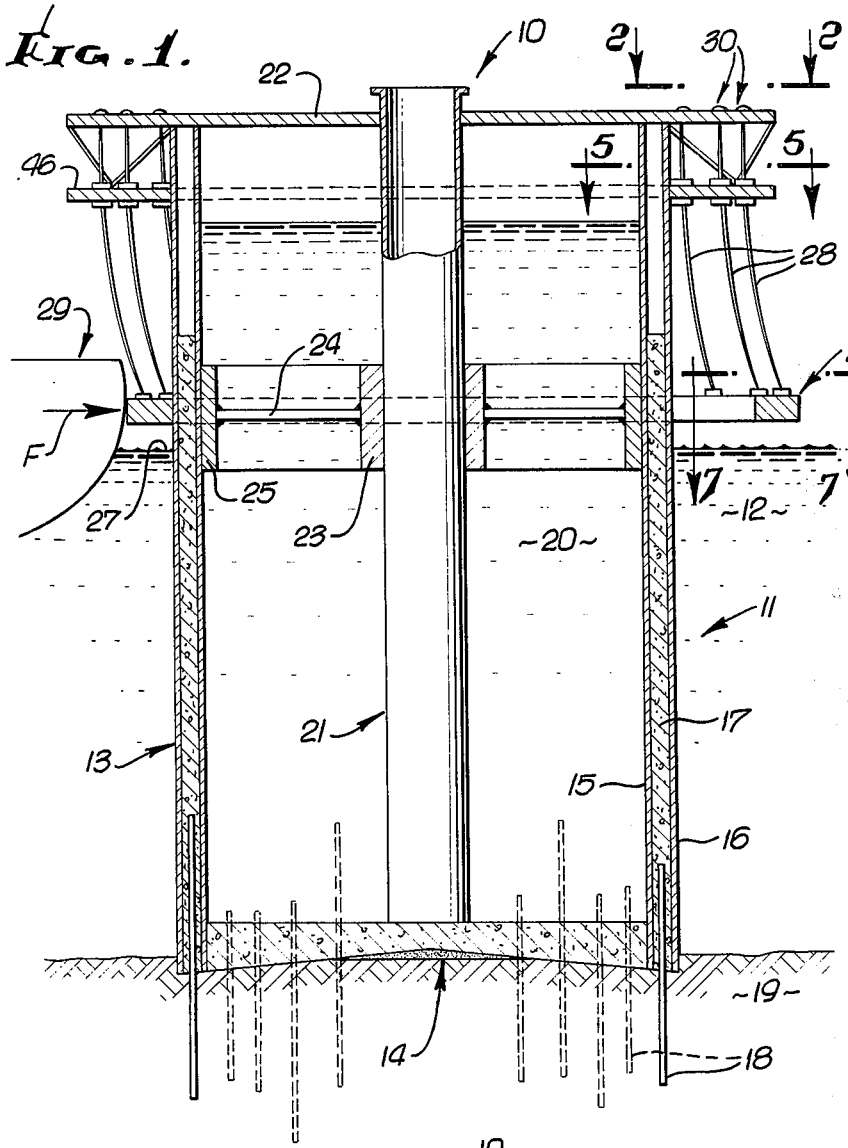
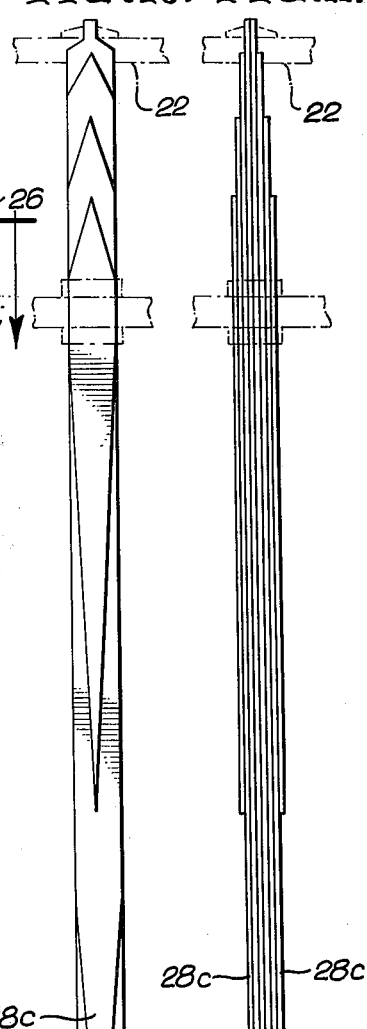
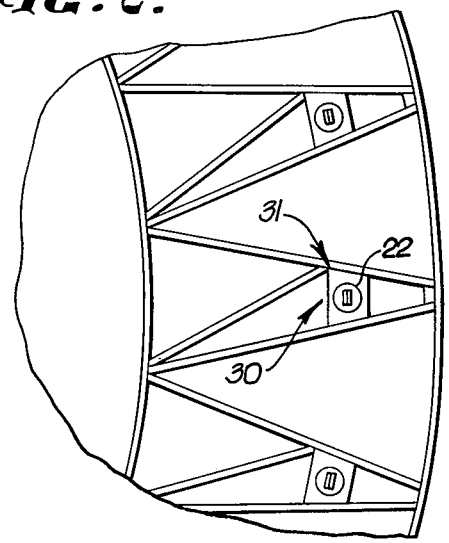
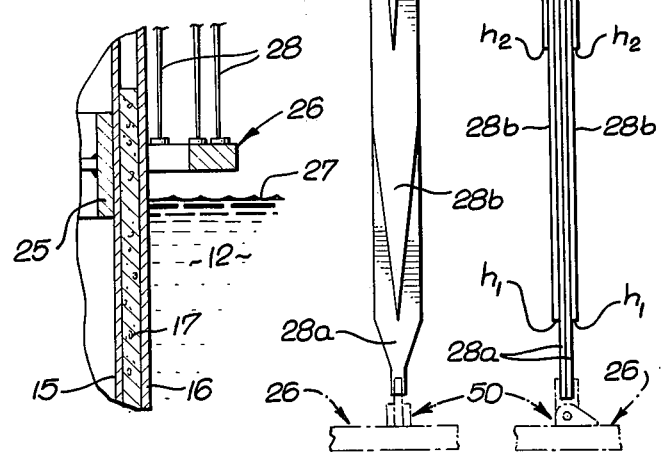

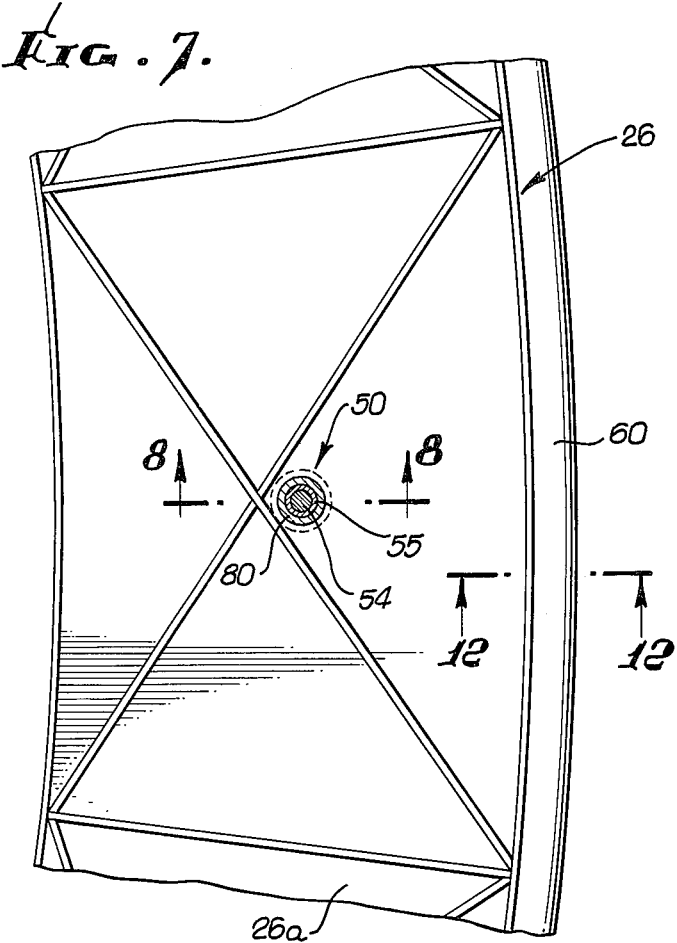
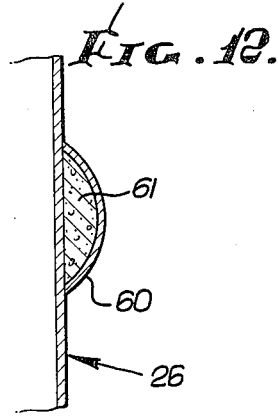
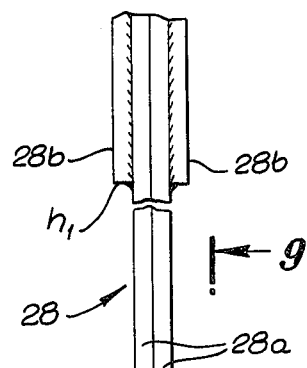
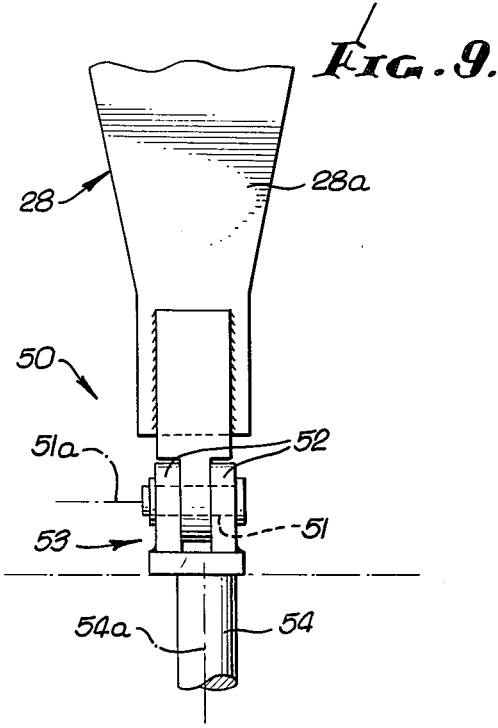
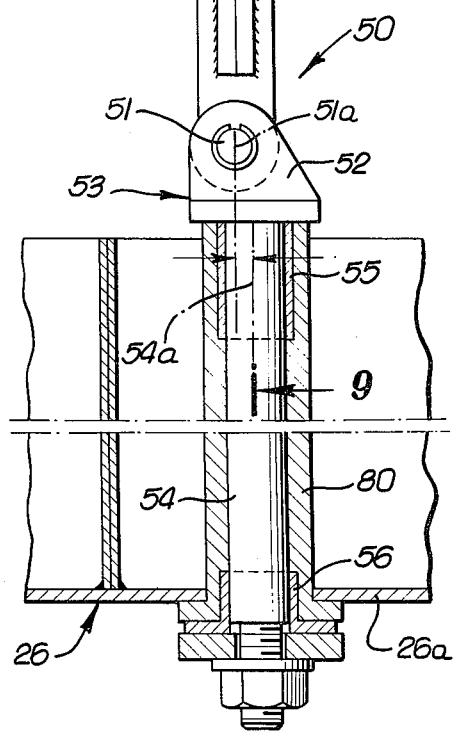

COLLISION BUMPER FOR OFFSHORE STRUCTURES

BACKGROUND OF THE INVENTION

This invention relates generally to bumper installations for absorbing or resisting vessel collision forces, and more particularly concerns bumper support means providing unusual advantages in structure, mode of operation and results.

There is need, especially in offshore well installation, for simple, effective means to resist and absorb the forces of impact produced by approaching vessels, in order better to avoid damage to the offshore structure itself, loss of petroleum and gas, risk of fire and loss of life. To my knowledge, no prior device or apparatus embodies the unusually advantageous combinations and sub-combinations of structural elements, modes of operations and results and now provided by the present invention.

SUMMARY OF THE INVENTION

It is a major object of the invention to provide a simple, effective system to resist and absorb large lateral forces produced upon impact by vessels closely approaching offshore installations such as produce oil, gas etc. Basically, the system is incorporated with offshore support structure (such as a heavy cylindrical shell, for example) standing upright in the water, and includes:

a. bumper means extending sidewardly of said structure in spaced relation thereto, b. upright flexure means suspending said bumper means, c. first support means suspending the upper extent of said flexure means, d. second support means blocking lateral displacement only of the flexure means below the level of the first support means and above the bumper means while allowing bending and of the flexure, e. said first and second support means carried by said structure.

As will appear, the first support means may include, for each flexure, a rotary bearing having a generally upright axis to accommodate flexure rotation about that axis; the second support means may include a vertical opening to pass the flexure and confine it for rotation and bending in such manner that maximum deflection of the flexure is permitted; the flexure lower extent may have rotary attachment to the bumper girder; and each rotary flexure may comprise multiple plates or leaves interconnected to bend in a preferred directional mode which is assumed by each flexure due to its self-orientation about its vertical axis in response to vessel collision with the bumper, from any azimuthal direction, and in response to wave action.

These and other objects and advantages of the invention, as well as the details of an illustrative embodiment, will be more fully understood from the following description and drawings, in which:

DRAWING DESCRIPTION

FIG. 1 is a vertical elevation, in section, showing one preferred form of the invention in active use;

FIG. 1a is a fragmentary elevation, in section;

FIG. 2 is an enlarged fragmentary plan view taken on lines 2—2 of FIG. 1;

FIG. 7 is an enlarged fragmentary plan view taken in section on lines 7—7 of FIG. 1, and showing flexure support of a bumper ring;

FIG. 8 is an enlarged vertical elevation taken in section on lines 8—8 of FIG. 7 showing the caster principle;

FIG. 9 is a vertical elevation taken in section on lines 9—9 of FIG. 8;

FIG. 10 is an enlarged elevation taken normal to FIG. 11 and showing a flexure face;

FIG. 11 is a side view of the FIG. 10 flexure; and

FIG. 12 is a section on lines 12—12 of FIG. 7.

DETAILED DESCRIPTION

Figure 3:
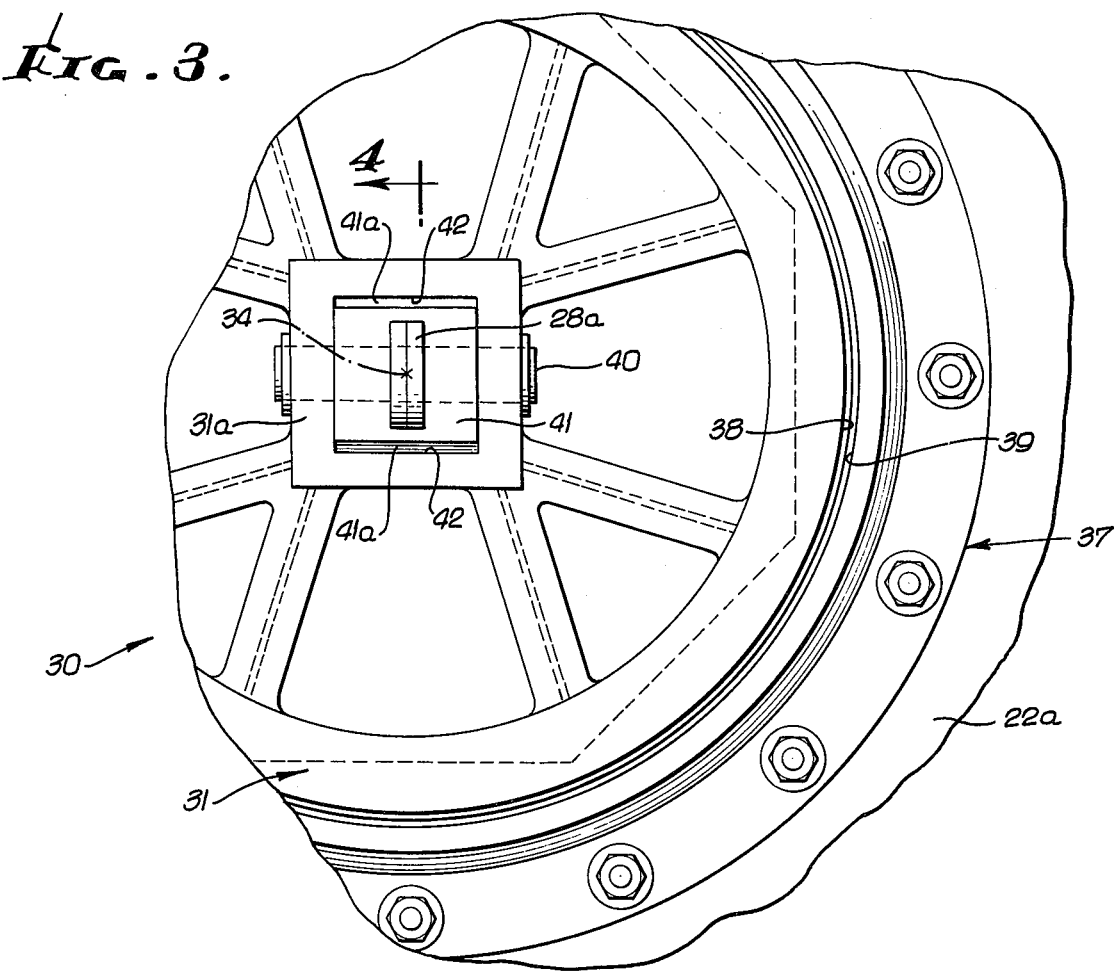
FIG. 3 is an enlarged fragmentary plan view showing of a flexure top support.

Referring to FIGS. 1 and 2, an offshore well and/or storage installation is shown at 10, to be used for recovery and/or storage of petroleum or gas. The installation includes support structure 11 standing upright on the ocean floor, or other water body 12, such structure including for example a cylinder 13 standing on the bottom, cement grout 14 having been pumped into position below the bottom. The cylinder may include interconnected inner and outer metal cylindrical shells 15 and 16, with concrete 17 filling the space therebetween up to predetermined height to provide a massive structure. Typically, the cylinder may stand in over 200 feet of water, and may project 140 feet or more above water, these dimensions being merely representative. Pilings 18 extend downwardly into the formation 19 from the concrete bonded to the shell structure. Petroleum produced by well operation may be stored at 20 within the cylinder interior, and it is contemplated that capacity may be 1,000,000 barrels or more. A hollow access shaft 21 may extend centrally upwardly within the cylinder interior to a deck 22 supported by the cylinder shaft 21 provides space for equipment such as pumps, compressors, generators etc. Reinforcement rings and radial webs are shown at 23–25, proximate water surface level 27.

In accordance with the invention, bumper means is provided to extend sidewardly of the structure, in spaced relation thereto. One such bumper is represented by the annular ring girder 26 extending in a loop, or circularly, about the cylinder, and above water level 27, the girder being typically filled with concrete. The bumper means is suspended by upright flexure means, which may with unusual advantage comprise a series of upright beam flexures 28 spaced about the cylinder structure 11. First and second support means are also provided, the first support means carried by structure 11 and suspending the upper extent of the flexure means; and the second support means is also carried by the structure 11 so as to block lateral displacement of the flexure means above and below the level of the first support means and above the level of the bumper means, while allowing bending of the flexure means toward and away from the structure 11. In this regard, note in FIG. 1 the rightward deflection of the entire bumper ring 26, in reponse to impact of a ship's hull 29, the flexures 28 bending as described to cushion the shock and resist bumper deflection. The arrow F indicates the direction of force application. For best results, the upper and lower extents of the flexures are designed so as to have their section moduli change at the same rate as the moments in the flexures. The girder should be very rigid so all flexures may carry the same load.

Figure 4:
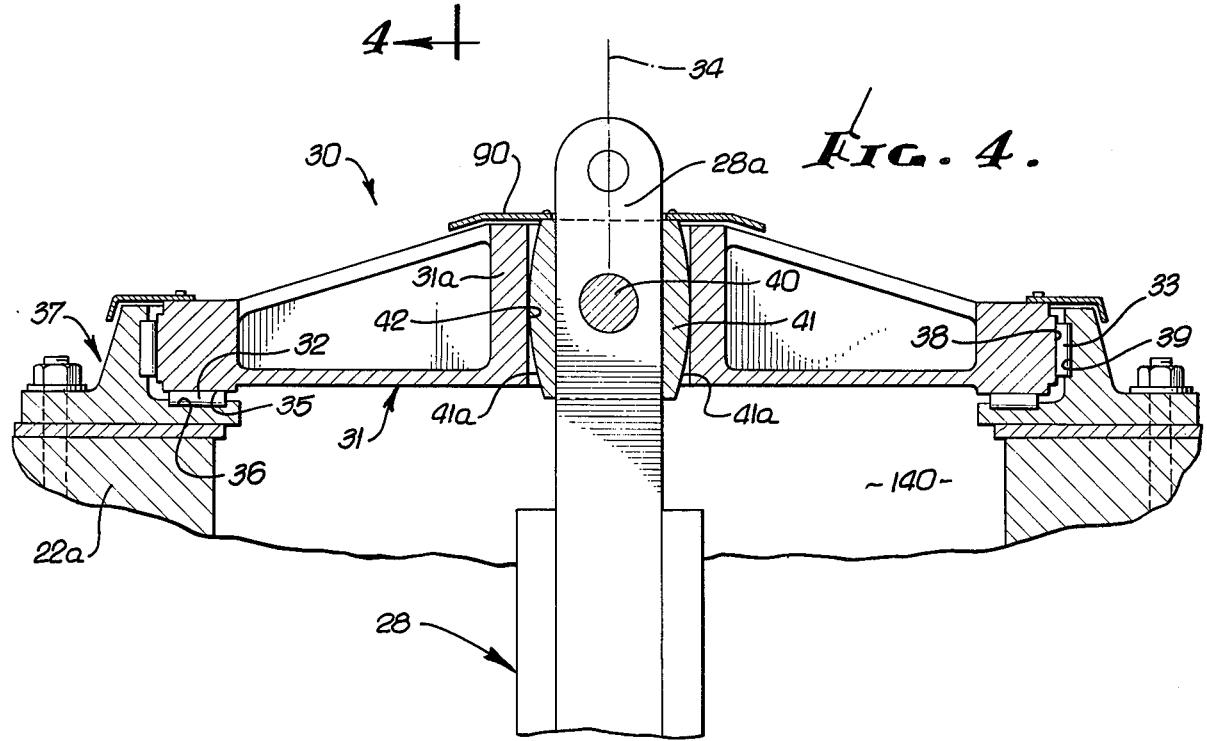
FIG. 4 is a vertical elevation taken in section on lines 4—4 of FIG. 3.

The first or upper support means for the vertically elongated flexures may, with unusual advantage comprise individually rotatable bearings having upright axes to accommodate rotation of the flexures about such axes. As seen in FIGS. 3 and 4, a typical self lubricating bearing generally indicated at 30 may include a support plate 31 (typically a steel casting) supported via thrust bearings 32 and peripheral guide bearings 33 to rotate about vertical axis 34. Bearings 32 are circularly spaced about axis 34 and confined between annular race 35 at the underside of the plate 31, and annular race 36 at the upper side of annular pillow block 37 mounted on deck structure 22a. Bearings 33 are also circularly spaced about axis 34 and confined between annular race 39 at the periphery of plate 31, and annular race 39 defined by block 37. Flexure 28 includes upper extension 28a pin connected at 40 to rocking auxiliary bearing 41 and to the plate hub 31a. Bearing 41 accommodates limited tilting of the flexure at the upper connection to plate 31, and for that purpose is outwardly convex at opposite sides 41a to slidably engage hub wall 42. Note opening 140 to permit flexure installation.

Figure 5:
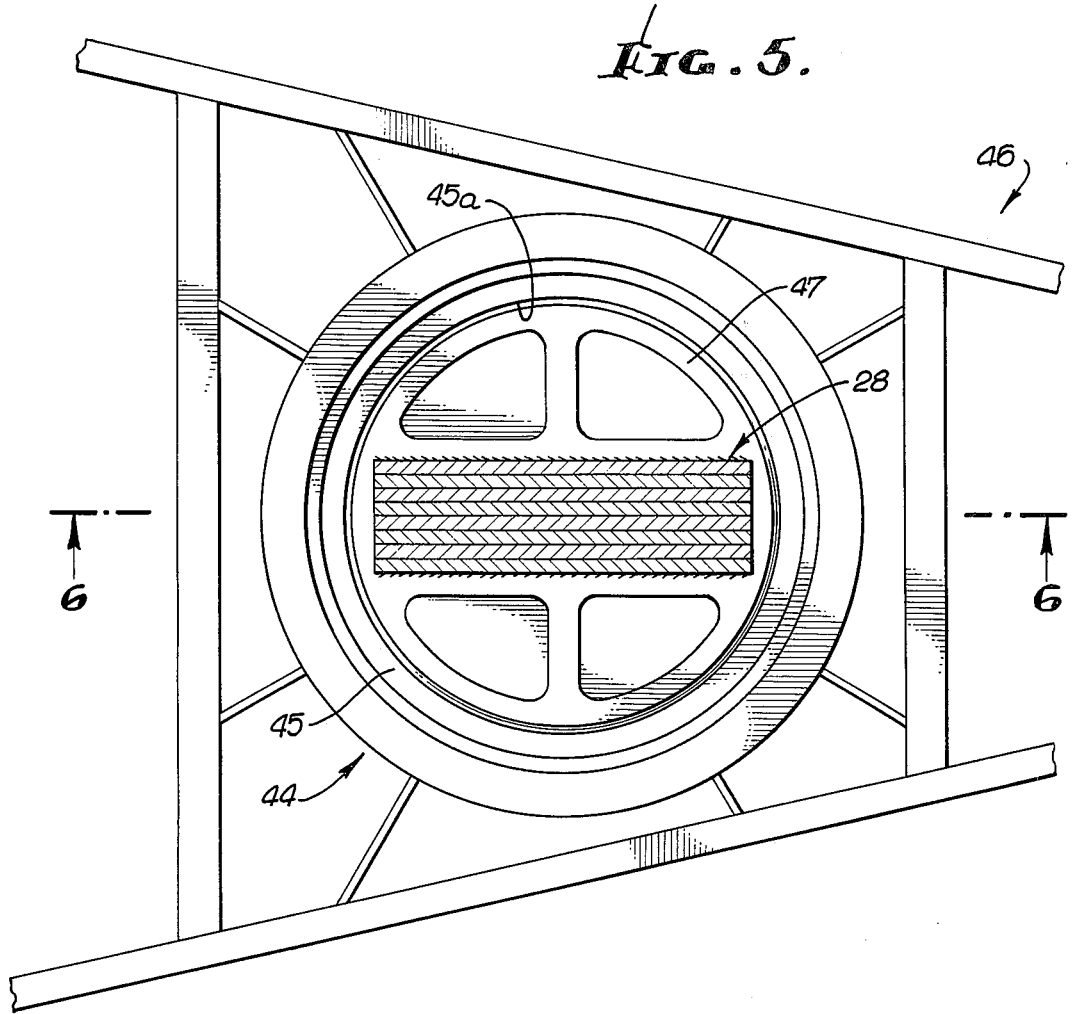
FIG. 5 is an enlarged fragmentary plan view taken in section on lines 5—5 of FIG. 1, and showing a flexure intermediate bearing and lateral support.
Figure 6:
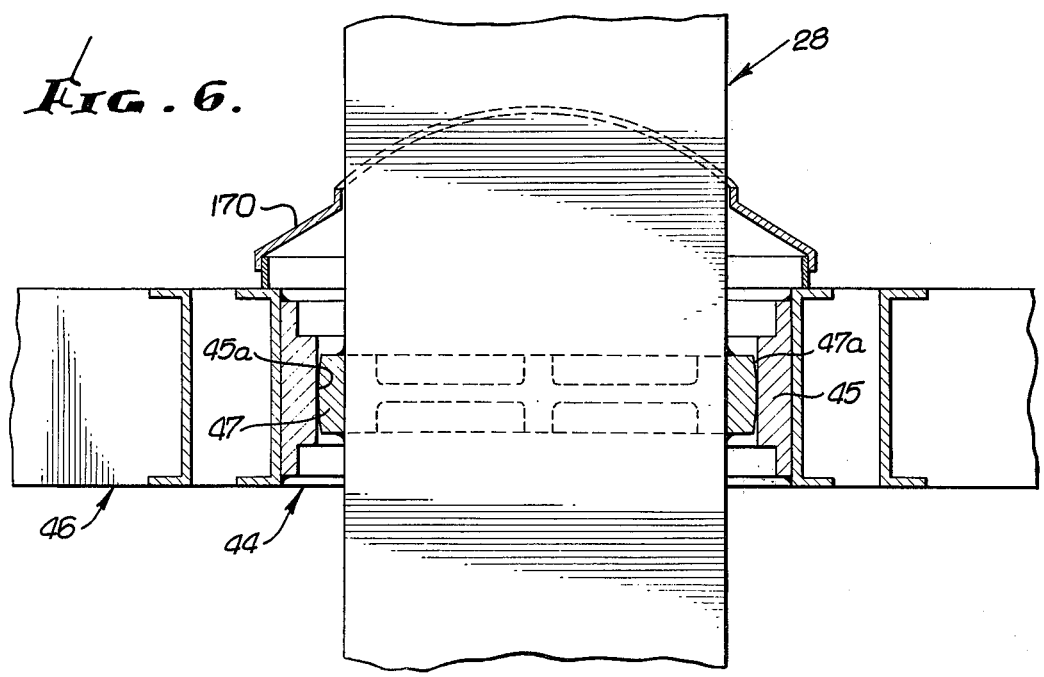
FIG. 6 is a vertical elevation taken in section on lines 6—6 of FIG. 5.

The second or lateral support means for the vertically elongated flexures may with unusual advantage include a series of second or lateral supports spaced about the central shell structure 13, and providing generally vertical openings through which the flexures freely extend. As seen in FIGS. 5 and 6, a typical second support generally indicated at 44 may include an annular bearing 45 carried by the frame structure 46 projecting laterally outwardly from the shell 13. The annular inner surface 45a of the bearing closely receives the annular inner bearing element 47 attached to the flexures 28 so as to center the rotatable flexure without constraining its bending in any direction. During such bending the element 47 tilts within the guide surface 45a. Note that the outer surface 47a of element 47 is outwardly convex in axial radial planes, to accommodate guiding, tilting and rotation as described. Accordingly, the flexure may bend without reversing curvature throughout its extent both above and below the second support means. Note dirtguard 170, in FIG. 6.

In this regard, the flexures 28 typically taper in a downward direction toward the bumper ring. For this purpose, each flexure may consist of a series of side-by-side stacked and interconnected (for example welded) "leaves", or plates, the lower ends of different leaves in sequence terminating at successively higher elevations, as seen in FIGS. 10 and 11. For example, the innermost two leaves 28a may extend downwardly to the bumper, whereas the two leaves 28b at opposite sides of leaves 28a terminate the level "h₁", the two leaves 28c at opposite sides of leaves 28b terminate at level "h₂", etc. Also, the leaves 28b, 28c, etc. may themselves taper downwardly as seen in FIG. 10. A leaf will typically starting to taper at the level where the adjacent leaf terminates. Accordingly, optimum flexing is achieved.

Finally, the lowermost extents of the flexures typically have rotary connection with the bumper girder 26. For the purpose, and as seen in FIGS. 7–9, a rotary connection 50 between each flexure and the girder 26 may include a horizontal pin connection at 51 between the flexure plates 28a and a channel component 52 of caster structure 53. The caster structure also includes a vertical pin or shaft 54 rotatably received by bearings 55 and 56 attached to the plate 26a of bumper girder 26 as via a sleeve 80. Note that the axis 54a of pin 54 is laterally offset from (i.e. eccentric to) the horizontal axis 51a of pin 51, allowing the flexure to rotate relative to the bumper in response to lateral deflection of the bumper, as described whereby the flexures may rotatably self-orient so as to bend, and in a direction generally normal to the planes of the leaves. The bearing structure at 41 and 42 in FIG. 4 allows rocking of the flexure in a direction parallel to the planes of its leaves.

From the foregoing, it is clear that the flexures are supported at their upper ends so as to be free to rotate about their vertical axes, and are free to move angularly relative to their axes so as to increase the freedom to deflect at the lower ends of the flexures; the section moduli of the flexures vary along the flexure lengths, and at about the same rate as the change in bending movement; the moment of inertia of each flexure is minimized relative to the section modulus; the ring girder or bumper means is stiff so that all flexures will take about the same load, and the girder is heavy so as to provide as large a horizontal component as possible to resist deflection caused by the collision of a vessel; and the deflections of the flexures are maximized in order to maximize the length of travel of the resisting force. Flexures of other cross sections may be used.

FIG. 12 shows the provision of metal reinforcement ring 60 on and at the periphery of the girder 26. The ring may be filled with concrete 61 as shown, and is provided to distribute local damage.

I claim:

1. In an offshore installation including support structure standing upright in water, the combination comprising
  a. bumper means extending sidewardly of and about said structure in spaced relation thereto,
  b. upright flexure beam means suspending said bumper means, said flexure beam means including a series of beam flexures spaced about said structure and tapering downwardly toward the bumper means,
  c. first support means suspending the upper extents of said beam flexures,
  d. lateral support means blocking lateral displacement of the beam flexures below the level of the first support means and above the bumper means while allowing bending of the beam flexures both above and below the second support means,
  e. said first and lateral support means carried by said structure.

2. The combination of claim 1 wherein said first support means includes for each beam flexure a rotary bearing having a generally upright axis to accommodate beam flexure rotation about that axis.

3. The combination of claim 1 wherein said bumper extends in a loop about said structure.

4. The combination of claim 2 wherein said lateral support means includes a series of lateral supports spaced about said structure and providing generally vertical openings through which said beam flexures respectively freely extend, said openings located at a common horizontal level and above the major lengths of the flexures.

5. The combination of claim 2 wherein said rotary bearing includes a bearing supported rotary plate to which said flexure has connection via a central auxiliary bearing accommodating tilting of the flexure at the plate.

6. The combination of claim 1 wherein each flexure comprises a series of side-by-side stacked and interconnected upright leaves, the lower ends of different leaves terminating at successively higher elevations above the bumper means.

7. The combination of claim 4 wherein said second supports define circular openings, there being bearing elements on the flexures and received in said openings to tilt and rotate therein.

8. The combination of claim 4 wherein the lower extents of the flexures have eccentric rotary connection with the bumper means so as to be self energized to rotate, into bending orientation.

9. The combination of claim 1 wherein said structure comprises a heavy upright cylindrical shell about which said bumper extends, circularly.

10. The combination fo claim 3 including a reinforcement ring at the periphery of said loop.

11. In an offshore installation including structure standing upright in the water, the combination comprising a. a loop-shaped bumper extending sidewardly of and about said structure in sidewardly spaced relation thereto,
b. longitudinally upright beam flexures suspending said bumper,
c. upper supports suspending the beam flexures for bodily rotation about upright axes,
d. lateral supports blocking lateral displacement of the flexures at a common level below the upper supports and above the bumper while allowing lateral bending of the flexures, the major lengths of the flexures located below that common level,
e. said upper and lateral supports carried by said structure,
f. there being means connecting the flexures to the bumper characterized in that the flexures are caused to rotate about said axes and into position to flex laterally and yieldably resist lateral displacement of the bumper means, in response to such bumper lateral displacement.

12. The combination of claim 1 wherein the flexure beams are alike and have cross sections which diminish in a downward direction below said lateral support means and characterized in that the section modulus of each flexure beam varies along the beam length at about the same rate as the change in bending moment.

13. The combination of claim 11 wherein the flexure beams are alike to have cross sections which diminish in a downward direction below said lateral supports and characterized in that the section modulus of each flexure beam varies along the beam length at about the same rate as the change in bending moment.

* * * * *